United States Patent [19]

Clasen

[11] Patent Number: 5,090,980
[45] Date of Patent: Feb. 25, 1992

[54] METHOD OF PRODUCING GLASS BODIES WITH SIMULTANEOUS DOPING AND SINTERING

[75] Inventor: Rolf Clasen, Aachen, Fed. Rep. of Germany

[73] Assignee: U.S. Philips Corp., New York, N.Y.

[21] Appl. No.: 507,949

[22] Filed: Apr. 10, 1990

[30] Foreign Application Priority Data

Apr. 11, 1989 [DE] Fed. Rep. of Germany ....... 3911745

[51] Int. Cl.$^5$ .............................................. C03C 25/02
[52] U.S. Cl. .............................. 65/3.12; 65/DIG. 16; 65/900; 65/18.1; 65/18.3; 65/30.1; 65/3.11; 134/2; 134/22.11; 264/60; 385/123
[58] Field of Search .......................... 65/3.11, 3.2, 18.1, 65/18.3, 18.4, 31, 30.1, 60.53, 42, 900, 3.12, DIG. 16; 134/2, 22.1, 22.11, 28, 30; 264/60, 62; 350/417; 427/165

[56] References Cited

U.S. PATENT DOCUMENTS

| | | | |
|---|---|---|---|
| 4,501,601 | 2/1985 | Haupt | 65/2 |
| 4,586,943 | 5/1986 | Kyoto et al. | 65/DIG. 16 |
| 4,681,614 | 7/1987 | Clasen et al. | 65/2 |
| 4,682,995 | 7/1987 | Clasen | 65/2 |
| 4,684,385 | 8/1987 | Clasen | 65/3.11 |
| 4,684,387 | 8/1987 | Clasen et al. | 65/DIG. 16 |
| 4,734,117 | 3/1988 | Pilon et al. | 65/DIG. 16 |
| 4,775,401 | 10/1988 | Fleming et al. | 65/3.11 |
| 4,822,399 | 4/1989 | Kanamori et al. | 65/900 |
| 4,867,774 | 9/1989 | Dorn | 65/900 |

FOREIGN PATENT DOCUMENTS

| | | |
|---|---|---|
| 182250 | 5/1986 | European Pat. Off. . |
| 228082 | 7/1987 | European Pat. Off. . |
| 249230 | 12/1987 | European Pat. Off. . |
| 3511439 | 10/1986 | Fed. Rep. of Germany . |
| 3511450 | 10/1986 | Fed. Rep. of Germany . |
| 3511453 | 10/1986 | Fed. Rep. of Germany . |
| 62-30636 | 2/1987 | Japan . |
| 1-275442 | 11/1989 | Japan . |

*Primary Examiner*—Kenneth M. Schor
*Assistant Examiner*—John J. Bruckner
*Attorney, Agent, or Firm*—William L. Botjer

[57] ABSTRACT

A method of producing glass bodies having regions with different optical refraction, including a basic body and a coating layer which is sintered onto the basic body, covers the basic body at least partially and is made of glass, which as it is doped, has an index of refraction differing from that of the glass of the basic body. The starting material for producing the cladding on the basis of pulverulent ceramic material is deformed into a self-supporting, unsintered porous green body, is dried and submitted to a cleaning procedure in a heated gas phase. The coating layer to be bonded onto the basic body is melted into glass in a subsequent combined doping/sintering procedure in a gas phase containing the doping agent at a temperature in the range from 1150° to 1500° C. and is sintered onto the basic body.

32 Claims, 1 Drawing Sheet

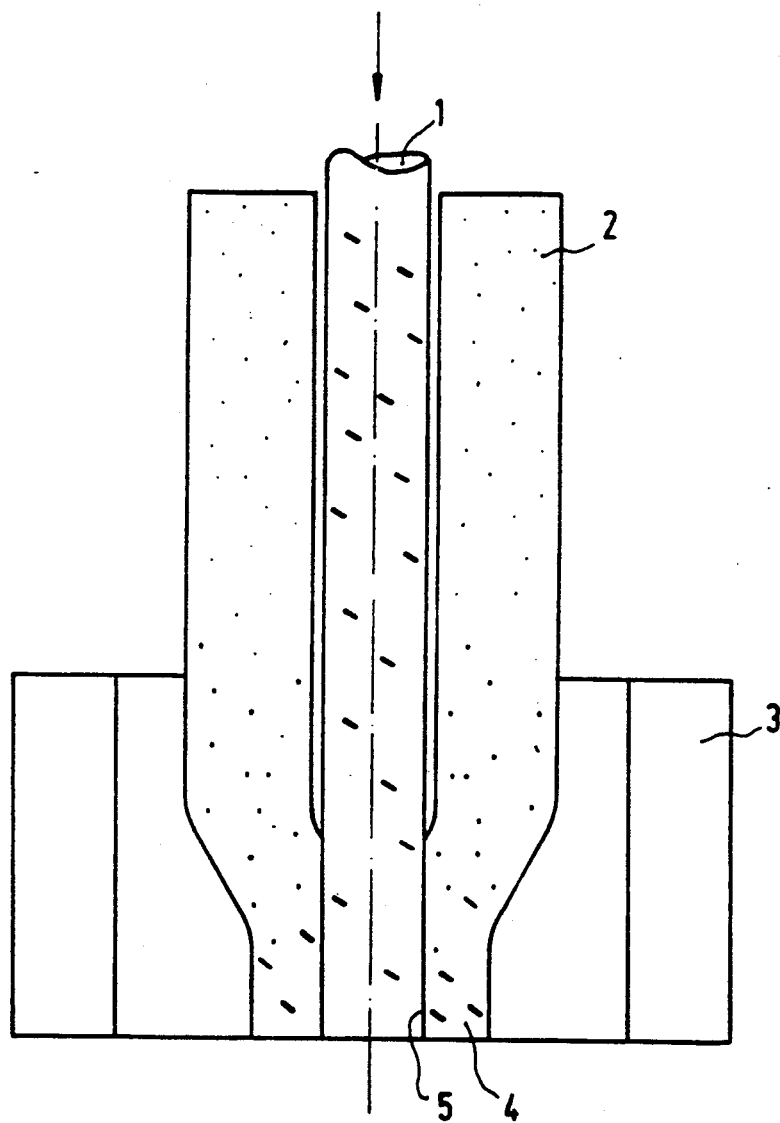

METHOD OF PRODUCING GLASS BODIES WITH SIMULTANEOUS DOPING AND SINTERING

BACKGROUND OF THE INVENTION

The invention relates to a method of producing glass bodies having regions with different optical refractions, consisting of a basic body and a coating layer which is sintered onto the basic body, covers the basic body at least partially and is made of a glass which, as it is doped, has a different index of refraction than the glass of the basic body.

The invention relates more specifically to a method in accordance with which the sintered glass body consisting of the basic body and a coating layer is further used as a preform with core and cladding glass for the production of an optical waveguide. It is however possible to use the glass body manufactured in accordance with the method of the invention in a very general way for the production of optical systems in which glass bodies having regions with a different reflection behaviour are required, such as, for example, lens systems. In such a case it is not necessary for the coating layer to surround the basic body as a jacket, but it must only cover a main region of its surface area whilst forming a sharply defined interface between the two glasses of a different reflection behaviour (basic body and coating layer). The glass body may, for example, be a rectangular parallelepiped and may be subjected to a mechanical further treatment.

The European Patent Application EP-182 250 discloses that by concentric combining of a glass rod and a cladding glass rod a preform for the manufacture of an optical fibre (rod-in-tube method) can be produced. A disadvantage of this method is that first two preformed bodies of glass must be made and subsequent thereto the interfaces between the components must be cleaned at great cost, before these two components can be sintered together. This method has the further disadvantage that sintering together of the two components must be effected at a relatively elevated temperature, (>2000° C.); this may result in unwanted changes in the geometry of the system, i.e. core glass and cladding glass flow already, so that the boundary between these glasses is no longer sharply defined.

From the European Patent Application EP-228 082 it is known to obtain a refraction index gradient in the core and cladding region of an open-pored green body by controlling the fluor partial pressure during the sintering operation. A disadvantage of this method is that no sharply defined boundaries between the different refraction index regions can be obtained. This patent application refers also to other methods of producing different refraction indices by a gradient of the green density, the particle diameter or the sintering ratio (change in the viscosity by co-doping in the core region). This method has the same limitations that no sharp boundaries between the different refraction index regions can be obtained.

The European Patent Application EP-249 230 discloses a method in which from two differently doped rods which are manufactured by means of a VAD procedure (vapour axial deposition) and sintered into compact glass a first rod is formed into a tube by means of an ultrasound drill and then the second rod is stretched and subsequently inserted into the tube, whereafter this system is sintered together.

This method has the disadvantage that the mechanical treatment of a sintered glass is very costly and complicated and that error-free interfaces between the rod and the tube cannot be guaranteed with certainly.

SUMMARY OF THE INVENTION

The invention has for its object to provide a method by means of which a glass body can be produced with accurately defined regions of different optical refraction behaviours using only few simple production steps, which in its totality and more specifically in the boundary region of the glasses of different refractive indices has only very small concentrations in the ppb-range of unwanted contaminations and which can be produced without bubbles and streaks.

According to the invention, this object is achieved in that the starting material for producing the coating layer on the basis of pulverulent ceramic material is deformed into a self-supporting, unsintered porous green body, is dried and submitted to a cleaning procedure in a heated gas phase, whereafter the coating layer bonded onto the basic body, is melted into glass in a subsequent combined doping/sintering procedure in a gas phase containing the dopant at a temperature in the range from 1150° to 1500° C. and is sintered onto the basic body.

In accordance with advantageous further developments of the method according to the invention, a cylindrical glass rod is used as the basic body and a hollow cylinder as the coating layer, the cylindrical glass rod constituting the basic body being inserted into the hollow cylindrical green body constituting the coating layer and the basic body and the coating layer are concentrically secured to each other at one end, before the doping/sintering procedure is performed. Such a glass body can be used as a preform for optical waveguides.

In accordance with further advantageous embodiments of the method of the invention, the green body constituting the coating layer is cleaned for a period of 2 hours at a temperature of approximately 400° C. in an atmosphere containing oxygen and 10% by volume of thionylchlorid SOCl₂ and subsequent thereto for a period of 4 hours at a temperature of approximately 1100° C. in an atmosphere containing oxygen and 10% by volume of chlorine gas Cl₂, it being possible to repeat the cleaning step before the sintering procedure with the system consisting of the basic body and the green body constituting the coating layer. This has particular advantages for the manufacture of highly purer glass bodies, for example then when a basic body which has not yet been completely densely sintered is used, for example when this basic body is made from a preform which was produced by deposition from a silicious gas phase by means of plasma activated chemical vapour deposition (PCVD) or modified chemical vapour deposition (MCVD). In this case it is recommendable to use a material for the basic body which, compared with the material for the coating layer, shrinks to a significantly less extent.

In accordance with a further advantageous embodiment of the method of the invention, the doping/sintering procedure is effected in a gas atmosphere which contains a fluor-containing gas as the dopant in a quantity from 10 to 100% by volume, an inert gas in a quantity from 0 to 90% by volume and chlorine gas Cl₂ in a quantity from 0 to 5% by volume, the dopant used being $C_2F_6$, $SF_6$, $SO_2F_2$, $CF_4$ and/or $NF_3$. Advantageously, the doping-sintering procedure is performed in a gas atmosphere which contains 50% by volume of $CF_4$, 1% by volume of chlorine gas $Cl_2$ and helium for the remaining portion.

Such a doping procedure provides a glass which, compared to an undoped quartz glass, has a lower index of refraction. A lower index of refraction can alternatively be obtained when doping is effected with a boron-containing dopant. If, for example, a dopant containing germanium or aluminium is used, a refractive index higher than that of undoped quartz glass can be obtained.

Particularly when a relatively high fluor doping is desired, this can only be achieved by means of doping from the gas phase and the appropriate conditions for such a doping procedure are provided by porous, unsintered green bodies. Particularly when $CF_4$ is used as a dopant, good results are obtained whilst no volatile silicon-fluor compounds occur, consequently substantially no etching of the silicon-containing green body to be doped occurs (measurements showed a loss in weight of Si of $\leq 0.5\%$ by weight). Doping with fluor does not only decrease the index of refraction of a quartz glass but also the viscosity. In addition, the thermal linear coefficient of expansion becomes less, which results in a low compressive stress in the region of the cladding, when an undoped basic body is clad with a fluor-doped coating layer. For the manufacture of optical waveguides in the form of optical fibres this has the advantage that an increased fibre strength is obtained. In addition thereto, a fluor doping also prevents the penetration of OH-ions, the long-time water resistance of such optical waveguides is also improved.

In accordance with an advantageous further embodiment of the method of the invention, the sintering procedure is performed at a temperature in the range from 1300° to 1350° C. This is achieved by doping the material for the coating layer with fluor during the sintering operation. Already a fluor doping of 0.2 mole % effects a reduction of the sintering temperature of quartz glass to 1450° C. at an immersion rate v of the body to be sintered of $v=10$ mm/min in the sintering furnace. With a fluor doping of 1 mole % sintering temperatures in the range from 1300° C. to 1350° C. can be obtained.

In accordance with a further advantageous embodiment of the method according to the invention the basic body and the green body constituting the coating layer, at least however the green body constituting the coating layer, are manufactured from a suspension containing a dispersion solution and as solid material $SiO_2$ particles having a diameter in the range from 10 to 500 nm, preferably in a range from 10 to 100 nm, and an average particle diameter of 40 nm.

Preferably a suspension having a solid material: dispersion solution weight ratio of 0.5:1 to 1.25:1 is used and water is the dispersion liquid.

If, as a starting material for the manufacture of the coating layer pulverulent ceramic material is used, as is the case for the composition of a suspension, then a relatively high green density of the green body produced from the suspension can be obtained, which results in a comparatively low shrinkage and consequently a low risk of cracking during sintering. Green bodies produced from suspensions have relative green densities of more than 35%. This results in a linear shrinking during sintering of not more than 30% at a maximum, so that the risk of crack formation, and this relates particularly to bodies having greater wall strengths is very low. If, for example, for the manufacture of the glass body a cylindrical glass rod is used as the basic body and a hollow-cylindrical green body enveloping the glass rod is used as a coating layer, the difference between the internal diameter of the coating layer tube and the external diameter of the basic body rod (with respect to the densely sintered glass rod) must be less than the shrinkage of the coating layer tube during sintering.

In accordance with advantageous developments of the method of the invention, an ionogenic admixture is added to the suspension, which shifts the pH value of the suspension towards the basic range (pH $\geq 5$ and $\leq 8$), an aqueous 5% $NH_4F$ solution being added as the ionogenic admixture, preferably in a quantity from 0.1 to 5% by weight, with respect to the proportion of solid material in the suspension.

This has the advantage that the ionogenic admixture which acts as a cross-linking activator is available in such a quantity that precisely the surfaces of the solid material particles in the suspension are coated with ions of the ionogenic admixture. The quantity of ionogenic admixtures added shall not exceed 5% by weight, with respect to the proportion of solid material in the suspension, as otherwise the viscosity of the suspension is increased to such an extent that an efficient homogeneisation becomes difficult.

In accordance with advantageous further developments of the method of the invention, the cleaning procedure is effected in an oxygen or inert gas atmosphere with an admixture of 1 to 10% by volume of a chloric gas at a temperature in the range from 400° C. to 1100° C. for a period of up to 8 hours, helium preferably being used as the inert gas and chlorine gas $Cl_2$ or thionyl chloride $SOCl_2$ as the chloric gas. For the manufacture of glass bodies to be used in optics quartz glasses are required which must be substantially free from contaminations and which must more specifically be substantially free from water. The manufacture of such pure glasses by the conventional way of producing from a glass melt has its limitations, as here in particular the contamination by water contained in the glass matrix is too high. For that reason it is advantageous to produce highly pure glasses of this type by sintering porous green bodies of the finest possible quartz glass particles having a particle size in the range from 1 to 500 nm. Since they are porous and consequently permeable to gass, the green bodies can, after drying, be submitted to a cleaning step in a heated gas atmosphere which reacts with the contaminations and are subsequently sintered in the cleaned state into transparent glass at the appropriate temperatures. Detrimental contaminations, in addition to OH ions, are also ions and particles of the transition metals.

A method of cleaning porous green bodies which are used for the manufacture of optical waveguides is disclosed in, for example the German Patent Application DE 35 11 439.

The present invention has more specifically the advantage, that highly pure glass bodies which sharply define interfaces between glasses having different optical refraction layers can be produced. When glass bodies are manufactured in accordance with the rod-in-tube technique, the special advantage is obtained that it is not necessary to produce first two separate, already sintered glass bodies (core and cladding), which must then be bonded in an additional melting/collapsing procedure which requires elevated temperatures in the range of over 2000° C. and, since glass flows at these temperatures, does not result in sharply defined boundaries between the glasses having different refraction behaviours and also have the risk of unwanted contaminations which can no more be removed during the bonding operation are absorbed at the interfaces of the two glass bodies.

Both cleaning and also sintering, at least however the sintering of coating layers made of pulverulent ceramics and the sintering procedure for bonding the basic body and the coating layer material together is combined in accordance with the present method into one single production step. A further advantage is that a separate costly and not always absolutely complete cleaning of the interfaces before bonding the basic body and the coating layer together can be omitted.

The pulverulent ceramic designing of the coating layer material (starting from suspensions) enables high green densities up to approximately 50%, which does not cause shrinking and consequently there provides a reduced risk of cracking during sintering. A further advantage is that at the instant at which it is doped the pulverulent ceramic coating layer material is still completely without any glass phase already formed, so that gaseous doping material can contact the coating layer material over a relatively large surface area and thus is uniformly distributed over the glass phase which is in the process of being formed.

The pulverulent ceramic designing can be performed in accordance with a very simple method, such as it is described in, for example, the German Patent Application DE 35 11 453, or DE 35 11 450.

Particularly for the manufacture of optical waveguides there are specific advantages: it is possible to produce at low cost both big preforms for optical waveguides by combining a core which is produced by means of a PCVD method and has a refractive index profile with a thick-walled cladding tube (hybrid technology) and preforms for optical waveguides made from exclusively pulverulent ceramic glass bodies, having an undoped core glass and a cladding glass which has been doped with the object of changing the index of refraction.

BRIEF DESCRIPTION OF THE PREFERRED EMBODIMENTS

An embodiment of the invention and how it operates will now be described in greater detail with reference to the accompanying drawing.

BRIEF DESCRIPTION OF THE DRAWINGS

The FIGURE is a schematical, cross-sectional view of a glass body to be produced in accordance with the invention during the sintering process for bonding together the basic body and the coating layer.

DETAILED DESCRIPTION OF THE DRAWING

An already previously sintered cylindrical glass rod used as the basic body 1 is concentrically surrounded by a hollow cylindrical coating layer 2 which is present as a porous green body, but has not yet been sintered. The coating layer 2 is sintered free from cracks onto the basic body 1 while being conveyed through a sintering furnace 3 in the direction indicated by an arrow, in an atmosphere of helium, chlorine gas $Cl_2$ and at least a fluor-containing gas, such as, for example $CF_4$. A compound glass body 4 is then obtained which has a sharply defined interface 5 between the basic body 1 and the coating layer 2, which consists of glasses having different optical properties. This interface 5 is free from flows, such as bubbles or contaminations.

The basic body 1 may have been produced from a preform which is produced by deposition from a silicious gas phase by means of plasma activated chemical vapour deposition (PCVD) or modified chemical vapour depositions (MCVD) and which is subsequently collapsed.

It can however alternatively be produced via the pulverulent ceramic way from a suspension, dried, cleaned and subsequently sintered as a green body, similar to the method which will be described hereinafter. Irrespective of the method in accordance with which the basic body is produced, it is important that it has a very smooth surface, that is to say a surface which is free from undulations.

From a cross-linked aqueous suspension, consisting of 50% by weight of a pyrogenic silicic acid with particles of an average particle size of 40 nm and a particle size distribution in the range from 10 to 100 nm and an ionogenic admixture in the form of 1.5% by weight of $NH_4F$ relative to the proportion of solid material in the suspension, there is produced by means of a mould a rod-shaped green body which after having been removed from the mould and having been dried for a period of 2 hours at a temperature of approximately 400° C. in an atmosphere containing oxygen and 10% by volume of thionyl chloride $SOCl_2$ and is cleaned for a period of 4 hours at a temperature of approximately 1100° C. in an atmosphere containing oxygen and 10% by volume of chlorine gas $Cl_2$.

After sintering of this rod-shaped green body at a temperature of approximately 1500° C. in an atmosphere containing helium and 1% by volume of chlorine gas $Cl_2$ a glass rod free from bubbles and streaks—for the present example with a length of 300 nm and a diameter of 8 mm—is produced. Sintering is effected by lowering the green rod in the sintering furnace at a rate of $v=10$ mm/min.

The coating layer 2 is produced but for the sintering step in a similar method as described in the foregoing, but here however a mould having an interior core is used to obtain a hollow cylinder; the mould used for the example described here had an inner diameter of 30 mm, the interior core had a diameter of 10 mm. After removal from the mould, drying and cleaning in the manner described above, a green body was obtained as the coating layer 2, which had an outer diameter of 27.3 mm an inner diameter of 9.1 mm and a length of 300 mm.

In a flame the basic body 1 in the form of a glass rod and the coating layer 2 in the form of the hollow-cylindrical green body are carefully centrically fixed relative to each other by local bonding, and, starting from this fixed end, are conveyed through the zone sintering furnace 3 at a rate of $v=10$ mm/min. Helium with an admixture of 50% by volume of $CF_4$ and 1% by volume of $Cl_2$ was used as the sintering atmosphere. The maximum sintering temperature was 1350° C. The fluor doping in the sintered glass of the coating layer 2 was 1% by weight. The coating layer 2 was sintered crack and bubble-free onto the basic body 1. The indices of refraction $n_D$ were 1 $n_D=1.4580$ for the glass of the basic body and 2 $n_D=1.4530$ for the glass of the coating layer 2. The interfaces 5 between the two glasses were accurately sharply defined.

A concentration of OH-ions of less than 11 ppb and a concentration of Fe, Cr and Ni of less than 3 ppb (detection limit) were measured in the glass of the basic body 1.

Within the framework of the present method it is alternatively possible to bond together not only two glasses of different diffraction behaviours with sharply defined interfaces, but when the present method is repeatedly used it is also possible to produce multi-layer structures of glasses having different optical behaviours.

I claim:

1. A method of producing a glass body having regions with differing optical refractive indices having a basic body and a coating layer covering the basic body which has a different refractive index than that of the basic body, comprising the steps of:
providing a basic body of glass;
providing pulverized ceramic material to be formed into a coating layer;
deforming said pulverized ceramic material into a self-supporting unsintered porous green body;
drying and cleaning said green body by means of a heated gas thereafter;
disposing the green body and the basic body in proximity and;
melting the green body to form glass, by a combined doping and sintering procedure in a heated gas containing a refractive index altering dopant at a temperature of from 1150° to 1500° C., to sinter the green body and melting it onto the basic body as said coating layer.

2. A method as claimed in claim 1, wherein, a sintered glass rod is used as the basic body and a hollow body surrounding the basic body is used as the green body.

3. A method as claimed in claim 2, wherein, a cylindrical glass rod is used as the basic body and a hollow cylinder as the green body.

4. A method as claimed in claim 3, wherein, the cylindrical glass rod constituting the basic body is inserted into the hollow-cylindrical body constituting the green body, and the basic body and the green body are concentrically fixed to each other at one end before the doping and sintering procedure is performed.

5. A method as claimed in claim 1, wherein, a planar sintered glass block having main faces is used as the basic body and a planar unsintered green body covers the basic body on at least one of its main faces.

6. A method as claimed in claim 1, wherein, the cleaning is performed in an atmosphere consisting of oxygen or an inert gas said atmosphere having an admixture of 1 to 10% by volume of a chlorine gas at a temperature in the range of from 400° C. to 1100° C., for a duration of up to 8 hours.

7. A method as claimed in claim 6, wherein, helium is used as the inert gas.

8. A method as claimed in claim 6, wherein, chlorine gas $Cl_2$ is used as the chlorine gas.

9. A method as claimed in claim 6, wherein, thionyl chloride $SOCl_2$ is used as the chlorine gas.

10. A method as claimed in claim 1, wherein, the green body is cleaned during 2 hours at a temperature of approximately 400° C. in an atmosphere containing oxygen and 10% by volume of thionyl chloride $SOCl_2$ and subsequently for a period of 4 hours at a temperature of approximately 100° C. in an atmosphere containing oxygen and 10% by volume $Cl_2$.

11. A method as claimed in claim 10, wherein, the cleaning is repeated before the sintering.

12. A method as claimed in claim 11, wherein, the doping and sintering procedure is performed in a gas atmosphere which contains a fluorine gas in a quantity of from 10 to 100% by volume, an inert gas in a quantity of from 0 to 90% by volume and $Cl_2$ in a quantity from 0 to 5% by volume.

13. A method as claimed in claim 12, wherein, the atmosphere comprises at least one of $C_2F_6$, $SF_6$, $SO_2F_2$, $CF_4$ and $NF_3$.

14. A method as claimed in claim 13, wherein, the doping and sintering procedure is performed in a gas atmosphere which contains 50% by volume of $CF_4$, 1% by volume $Cl_2$ the remainder being helium.

15. A method as claimed in claim 14, wherein, the sintering procedure is performed at a temperature in the range of from 1300° to 1350° C.

16. A method as claimed in claim 15, wherein, at least the green body is produced from a suspension containing a dispersion liquid and solid material $SiO_2$ particles having a diameter in the range of from 10 to 500 nm, and an average particle diameter of 40 nm.

17. A method as claimed in claim 16, wherein, the suspension has a solid material: dispersion liquid-weight ratio of from 0.5:1 to 1.25:1.

18. A method as claimed in claim 17, wherein, water is used as the dispersion liquid.

19. A method as claimed in claim 18, wherein, an ionizable admixture is added to the suspension, causing the pH value of the suspension to shift towards the basic range.

20. A method as claimed in claim 19, wherein, an ammonium compound is used as the ionizable admixture.

21. A method as claimed in claim 20, wherein, an aqueous 5% by weight $NH_4F$ solution is used as the ionizable admixture.

22. A method as claimed in claim 21, wherein, the ionizable admixture is added in a quantity of from 0.1 to 5% by weight, relative to the solid material proportion of the suspension.

23. A method as claimed in claim 16, wherein, an aqueous suspension is used, which contains $SiO_2$ particles having an average particle diameter of 40 nm at a solid material:water-weight ratio of from 0.9:1 to 1.2:1 and to which a 5% by weight aqueous $NF_4F$ solution is added in a quantity of from 0.75 to 1.5% by weight relative to the solid material proportion of the suspension.

24. A method as claimed in claim 23, wherein, the basic body is produced in accordance with a method in which the suspension is poured in a mould, is cleaned after having been removed from the moulding and then dried, first for a period of 2 hours at a temperature of approximately 400° C. in an atmosphere containing oxygen and 10% by volume of a chlorine gas, and thereafter for a duration of 4 hours at a temperature of approximately 1100° C. in an atmosphere containing oxygen and 10% by volume of a chlorine gas and subsequently is sintered in an inert gas atmosphere containing 1% by volume of a chlorine gas at a temperature of approximately 1500° C.

25. A method as claimed in claim 24, wherein, $Cl_2$ or thionyl chloride $SOCl_2$ is used as the chlorine gas.

26. A method as claimed in claim 24, wherein, helium is used as the inert gas.

27. A method as claimed in claim 23, wherein, the basic body is produced from a preform which is obtained by deposition from a silicious gas phase by means of plasma activated chemical vapour deposition (PCVD) or modified chemical vapour deposition (MCVD).

28. A method as claimed in claim 27, wherein, the basic body and the green body are bonded to each other by local melting, before the melting step.

29. A method as claimed in claim 27, wherein, the basic body is a glass rod having a disc-shaped thickened portion and the green body is supported on the glass rod by said disc-shaped thickened portion, on which the green body bears after having been pushed onto the glass rod before the melting step.

30. A method as claimed in claim 29, further comprising using the glass body consisting of the basic body and the coating layer as a preform for the production of optical lenses.

31. A method as claimed in claim 29, further comprising using the glass body consisting of the basic body and the coating layer as a basic body for providing at least a further coating layer, said further coating layer having optical properties differing from those of the first coating layer.

32. A method as claimed in claim 27, further comprising using the glass body formed by the basic body and the coating layer as a preform to produce an optical waveguide.

* * * * *